(12) United States Patent
Pluess

(10) Patent No.: US 7,357,024 B2
(45) Date of Patent: Apr. 15, 2008

(54) SENSOR CARRIER FOR A FLOW METER

(75) Inventor: Heinz Pluess, Schoenbuehl (CH)

(73) Assignee: Digmesa AG, Ipsach (CH)

( * ) Notice: Subject to any disclaimer, the term of this patent is extended or adjusted under 35 U.S.C. 154(b) by 0 days.

(21) Appl. No.: 11/177,398

(22) Filed: Jul. 11, 2005

(65) Prior Publication Data
US 2006/0010975 A1    Jan. 19, 2006

(30) Foreign Application Priority Data
Jul. 13, 2004   (DE) ................ 20 2004 010 954 U

(51) Int. Cl.
*G01P 1/02*      (2006.01)
(52) U.S. Cl. ........................................ 73/431
(58) Field of Classification Search .......... 73/431, 73/861.02
See application file for complete search history.

(56) References Cited

U.S. PATENT DOCUMENTS 5,777,297 A    7/1998  Gelus ................ 219/254

2004/0093956 A1 * 5/2004  Straight et al. .......... 73/861.08

FOREIGN PATENT DOCUMENTS

| DE | 296 14 076 | 10/1997 |
|----|------------|---------|
| DE | 198 47 670 | 4/1999  |

* cited by examiner

*Primary Examiner*—Hezron Williams
*Assistant Examiner*—Tamiko Bellamy
(74) *Attorney, Agent, or Firm*—Paul Vincent

(57)   ABSTRACT

A sensor carrier comprising a cover part for a flow meter, with a sensor comprising connecting strands and a plug part covering the sensor and the connecting strands and having connecting pins which can be brought into contact with the connecting strands is characterized in that, at least in the region of the connecting strands, the space between the plug part and the cover part is covered by an electrically insulating elastic substance to provide reliable sealing.

8 Claims, 2 Drawing Sheets

SENSOR CARRIER FOR A FLOW METER

This application claims Paris Convention priority of DE 20 2004 010 954.9 filed Jul. 13, 2004 the complete disclosure of which is hereby incorporated by reference.

BACKGROUND OF THE INVENTION

The invention concerns a sensor carrier comprising a cover part for a flow meter, with a sensor having connecting strands and with a plug part which covers the sensor and the connecting strands and comprises connecting pins which can be brought into contact with the connecting strands. The invention also concerns a method for producing a sensor carrier for a flow meter.

A sensor carrier of this type is disclosed e.g. in DE 296 14 076 U1. It comprises a cover part for a flow meter which can be connected to a lower part of the flow meter through bayonet closures. The cover part bears a-sensor with connecting strands which are in electrical contact with the connecting pins held in a plug part.

Disadvantageously, moisture may enter between the cover part and the plug part and gain access to the region of the sensor and the connecting strands joined thereto, producing a short-circuit between the strands which can cause failure or which can impair the function of the flow meter.

It is the object of the invention to completely eliminate the danger of penetrating moisture and formation of short-circuits between the connecting strands of the sensor.

SUMMARY OF THE INVENTION

The above-mentioned object is achieved in accordance with the invention in a sensor carrier of the above-mentioned type in that, at least in the region of the connecting strands, the space between the plug part and the cover part is covered by an electrically insulating elastic substance. To solve the inventive object, the invention also proposes a method for disposing an electrically insulating substance of flowable or viscous form on a cover part provided with a sensor having connecting strands, and subsequent connection of a plug part having connecting pins to the cover part in a manner covering the electrically insulating substance and pressing against the cover part, thereby producing an electric contact between each connecting pin of the plug part and a respective connecting strand.

The electrically insulating elastic substance provided between the relevant region of the cover part and the plug part covering this area, produces reliable insulation and sealing, in particular, of the connecting strands of the sensor, of the sensor itself and of regions of the connecting pins within the plug part or the cover part. In a preferred embodiment of the invention, the space between plug part and cover part is completely filled by the electrically insulating elastic substance. In a further development of the invention, the flowable or viscous electrically insulating elastic substance is disposed and is hardened, the electrically insulating elastic substance preferably being silicone. The invention also provides that the cover part and plug part are brought into positive contact and/or flowable or viscous silicone is applied as electrically insulating substance on the region of the cover part covered by the plug part or on the side of the plug part facing the cover part.

Further advantages and features of the invention can be extracted from the claims and the following description which explains in detail an embodiment of the invention with reference to the drawing.

DESCRIPTION OF THE PREFERRED EMBODIMENT

Figure 1:
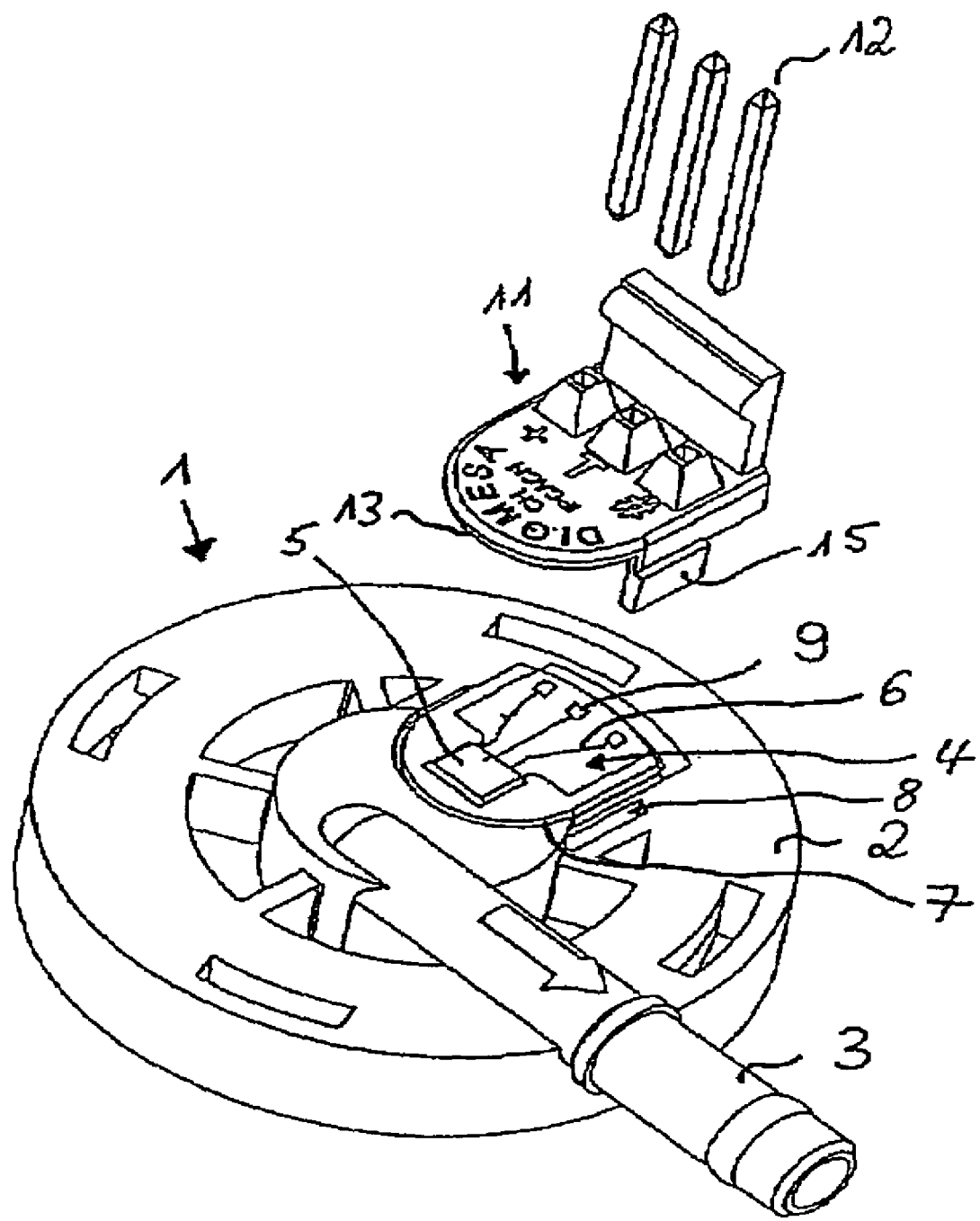
FIG. 1 shows an exploded view of the inventive sensor carrier in the form of a cover part for a flow meter.
Figure 2:
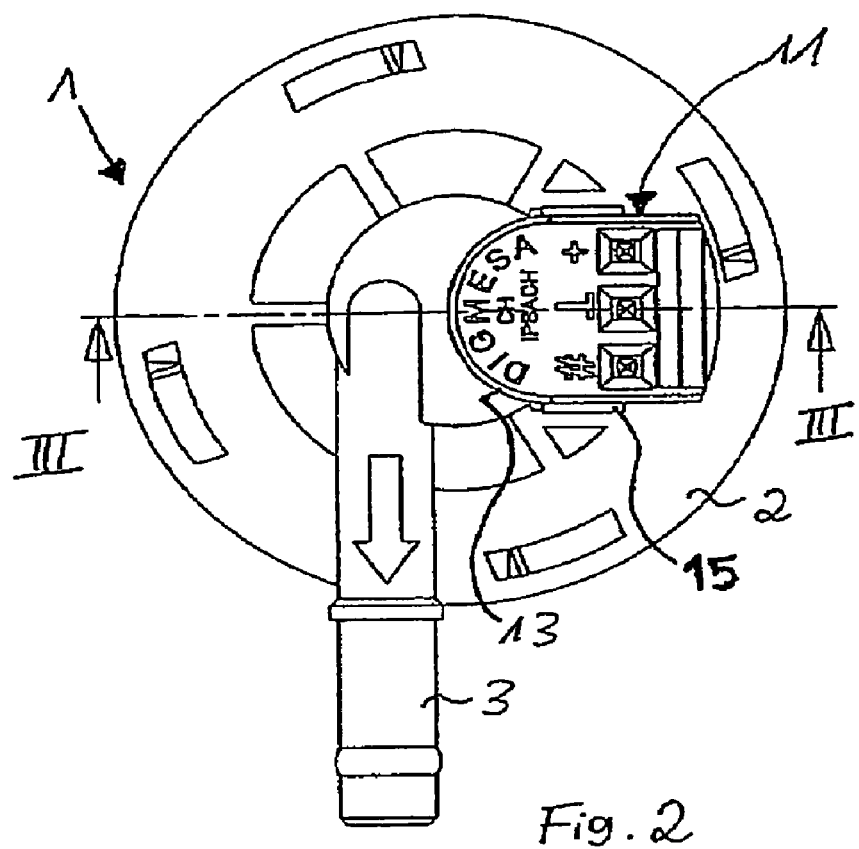
FIG. 2 shows a top view of the inventive sensor carrier in the finished state.

The sensor carrier 1 shown in the figures is a cover part for a flow meter as shown e.g. in DE 296 14 076 U1.

The inventive sensor carrier 1 has a cover part 2 which can be connected to a lower part of the flow meter (not shown) via bayonet closures (not shown in detail). The cover part 2 has a fluid connection 3, in the present embodiment, a fluid extension. The cover part also has a receiving area 4 for a sensor 5, from which connecting strands 6 are guided to depressions formed in the cover part 2. The connecting region 4 is surrounded by a groove 7. As shown in the illustrated embodiment, a plug part 11 of the inventive sensor carrier 1 which can be connected to the cover part 2 has connecting pins 12 which come into electrically conducting contact with the ends of the connecting strands 6 after connecting the plug part 11 to the cover part 2 within the recesses 7.

The contact part 11 has a lip 13 which is designed for engagement in the groove 7. The connected cover part 2 and plug part 11 are held in abutment through noses 15 which engage in and behind depressions 8 of the cover part 2.

Figure 3:
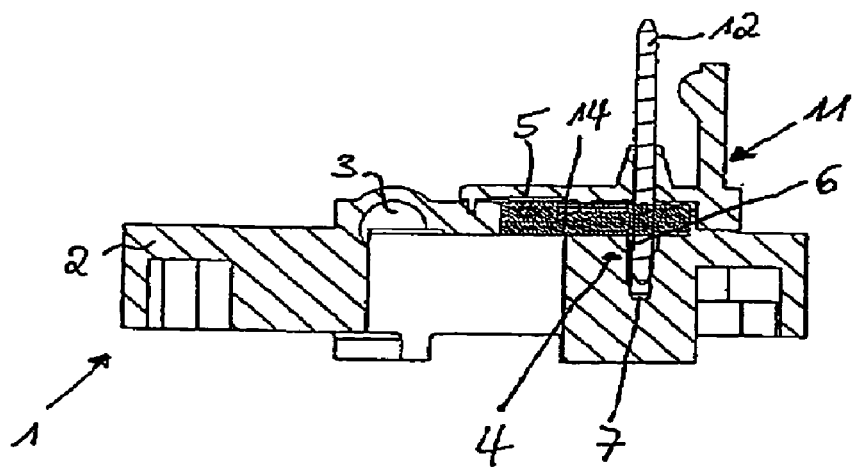
FIG. 3 shows a sectional view along the line III-III through the sensor carrier of FIG. 2.

To provide complete insulation and sealing against penetrating moisture which could cause, in particular, short-circuits in the region of the connecting strands 6, the space between the region 4 and the cover part 11 is sealed by an electrically insulating elastic substance, which is shown cross-hatched in FIG. 3. This substance is preferably silicone and is introduced in a flowable or viscous form to subsequently harden after mounting the plug part to the plug pins 9.

The insulating elastic substance 14 ensures safe protection of the sensor 5, of the strands 6 and of the contact pins (the latter inside of the sensor carrier) from penetrating moisture.

Subsequent to injection molding of the cover part 2, the method for producing the inventive sensor carrier proposes positioning of the sensor carrier 5 with its connecting strands 6 and introducing the ends thereof into the depressions 8 of the cover part 2. The flowable or viscous insulating substance 14 is subsequently disposed in the region 4 of the cover part 2 in such a manner that the substance covers both the sensor carrier 5 as well as the connecting strands 6. The plug part 11 with connecting pins 12 which have been introduced with frictional engagement therein is subsequently mounted and locked to the cover part 2 using the noses 15. The viscous insulating substance is thereby distributed through pressure and completely fills the space between cover part 2 and plug part 11 in the region 4 (see FIG. 3). The insulating substance 14 subsequently hardens. The inventive sensor carrier is then ready for use and can be connected to the lower part (not shown) of the flow meter for operation.

LIST OF REFERENCE NUMERALS 1 sensor carrier 2 cover part 3 fluid connection
4 receiving area
4 connecting area
5 sensor
6 connecting strands
7 groove
8 depressions
9 plug pins
11 plug part
12 connecting pins
13 lip
14 substance
15 noses

I claim:

1. A sensor carrier for a flow meter, the sensor carrier comprising:
   a cover part for covering the flow meter, said cover part defining a recess having a substantially closed bottom, substantially closed sidewalls, and an upper opening, said cover part also defining first means for retaining and locking;
   a sensor disposed within said recess;
   connecting strands disposed within said recess and connected to said sensor;
   a plug part structured and dimensioned as a separate component, non-integral with said cover part, said plug part having second means for retaining and locking cooperating with said first means for retaining and locking to secure said plug part on said cover part and seal said upper opening of said recess, thereby covering said sensor and said connecting strands;
   connecting pins disposed in said plug part, said connecting pins structured and dimensioned to connect to said connecting strands; and
   an electrically insulating, elastic substance disposed within said recess to completely fill a cavity defined by said recess and said plug part, thereby encasing said sensor and said connecting strands.

2. The sensor carrier of claim 1, wherein said elastic substance is disposed in a region of said connecting stands.

3. The sensor carrier of claim 1, wherein said electrically insulating elastic substance is applied in a flowable or viscous form and subsequently hardens.

4. The sensor carrier of claim 1, wherein said electrically insulating elastic substance consists essentially of silicone.

5. A method for producing the sensor carrier of claim 1, the method comprising the steps of:
   a) disposed the electrically insulating substance, in flowable or viscous form, onto the cover part;
   b) positioning the plug part, bearing the connecting pins, to cover the electrically insulating substance; and
   c) plugging the plug part onto the cover part to connect with the cover part and to produce electrical contract between connecting pins and respective connecting strands.

6. The method of claim 5, wherein the cover part and plug part are brought into positive contact.

7. The method of claim 5, wherein silicone in flowable or viscous form is disposed as the electrically insulating substance in a region of the cover part covering the plug part.

8. The method of claim 5, wherein silicone in flowable or viscous form is disposed as the electrically insulating substance on a side of the plug part facing the cover part.

* * * * *